J. C. WARREN.
RECORDING MECHANISM.
APPLICATION FILED JAN. 11, 1916.

1,255,250.

Patented Feb. 5, 1918.
3 SHEETS—SHEET 1.

Inventor
James C. Warren
by Spear, Middleton, Donaldson & Spear
Attys.

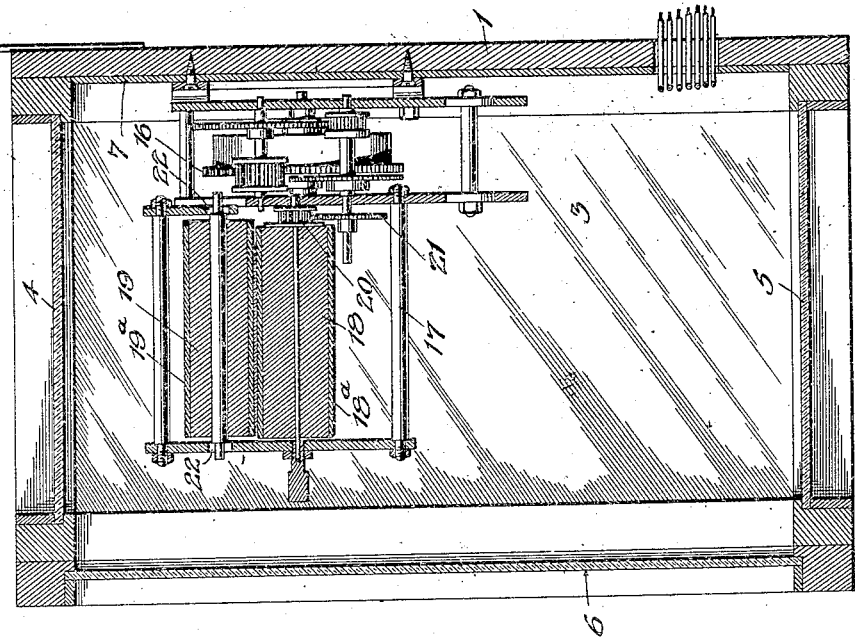
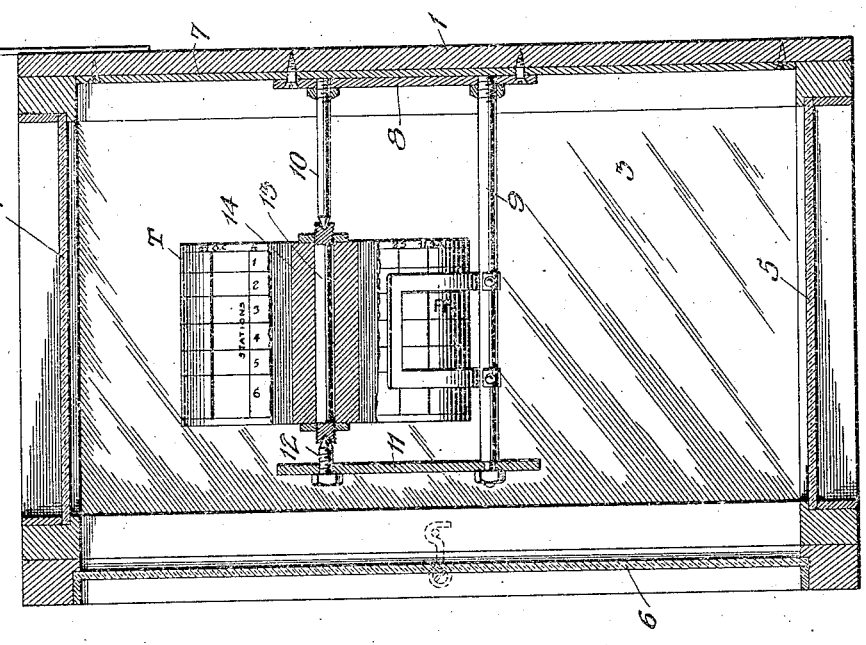

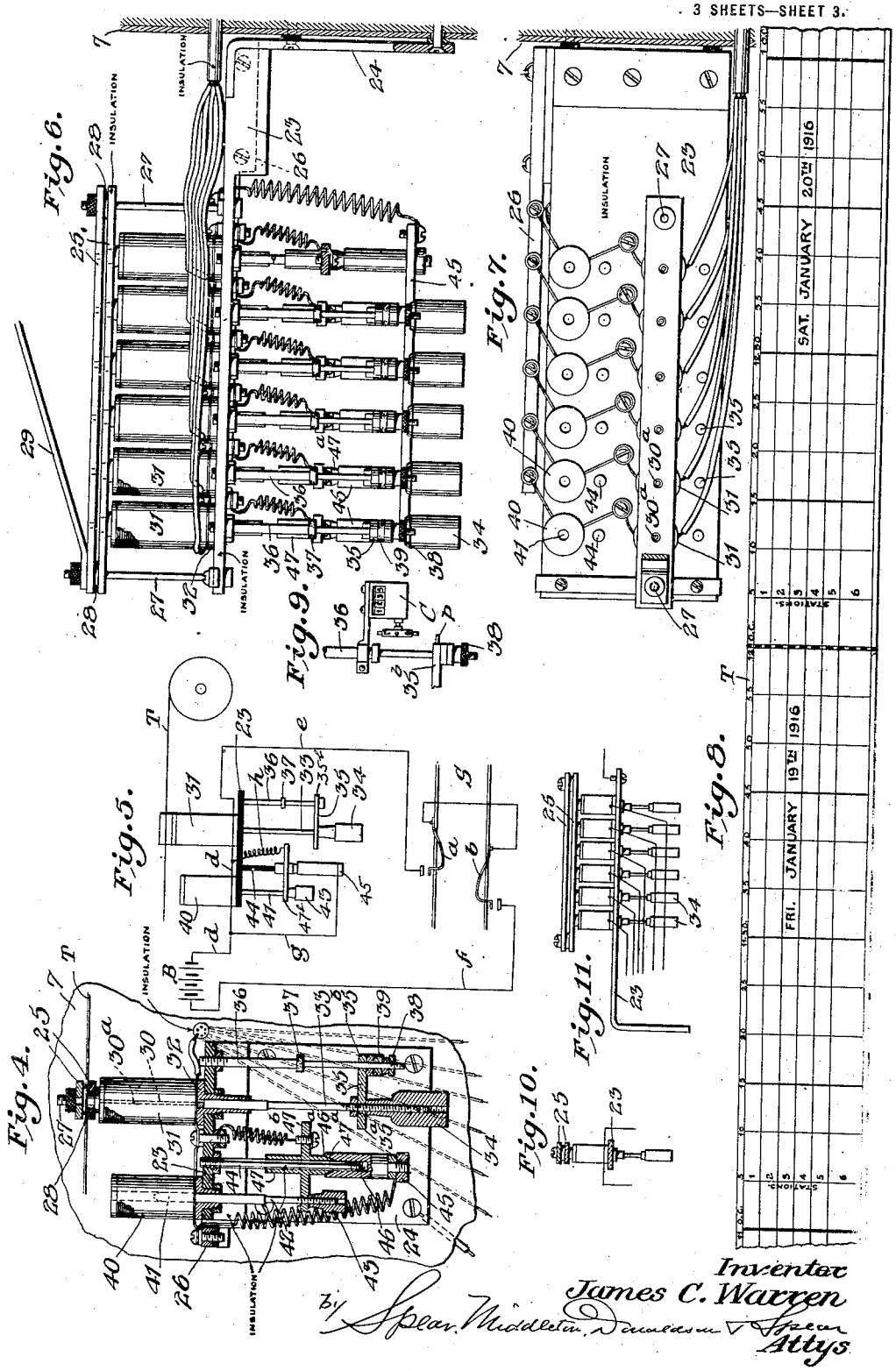

UNITED STATES PATENT OFFICE.

JAMES C. WARREN, OF EMPORIA, VIRGINIA.

RECORDING MECHANISM.

1,255,250.  Specification of Letters Patent.  Patented Feb. 5, 1918.

Application filed January 11, 1916. Serial No. 71,600.

*To all whom it may concern:*

Be it known that I, JAMES C. WARREN, a citizen of the United States, residing at Emporia, Virginia, have invented certain new and useful Improvements in Recording Mechanism, of which the following is a specification.

The present invention relates to improvements in recording instruments and pertains more particularly to that class of instruments in which the recording elements are operated by electro-magnetic means. In instruments of this general type, the permanent record consists of a paper sheet or tape, in which a series of perforations is formed by the recording elements.

The present invention contemplates certain improvements in recording instruments of this type, by which the machines will be capable of wider application than heretofore. The improvements embodied in the present invention are designed, furthermore, to facilitate the making, by means operating entirely automatically, of efficiency records, such as will indicate the continuity of service, actual output, or regularity of distribution, of work and material, in large industrial plants, where it is necessary to secure information or data at regular intervals, in order to attain a maximum working efficiency. Such automatic recording instruments would be of great value in large manufacturing plants, as for instance where lumber, ice, or bottled goods are prepared and delivered for distribution in large quantities. Though not intended to be limited in this respect, the present invention is described in its application to an ice plant, as this particular industry serves especially well to illustrate the many uses and possibilities of the apparatus.

Those familiar with this industry will appreciate the necessity of having the work progress systematically and at regular intervals, as often failure or negligence on the part of shiftless attendants will ruin the entire output of a large portion of the plant, for example where the ice cakes are removed too rapidly from the tanks and the temperature of the freezing medium is allowed to increase. All of these possibilities are precluded by use of the present form of recording instrument and in addition a permanent and accurate record can be produced, which will indicate the exact number of cakes of ice passing to or from any given station in the plant, during any given interval of time. Furthermore, by providing a record strip which is suitably marked off to indicate the various stations, the day of the month, the time of day and so forth, and by regulating the rate of movement of this strip past the recording element it is possible to secure an absolutely reliable record sheet containing valuable data, from which can be computed the rate of production, the regularity of attendants, or the actual output of the plant.

Further objects of the invention consist in certain improvements in details of construction by which the recording elements are adapted to automatically and accurately actuate at the desired instants.

With these and other objects in view, the invention consists in the combination and arrangement of parts more fully described in the following specification, illustrated in the accompanying drawings and pointed out in the appended claims.

In the drawings;

Fig. 2 is a transverse section on line 2—2 of Fig. 1, looking in the direction of the arrows, with parts shown in elevation.

Fig. 3 is a similar view on line 3—3 of Fig. 1.

Fig. 4 is a vertical sectional detail through one of the electro-magnetic actuating units, with parts shown in elevation.

Fig. 5 is a diagram showing a complete electric circuit for any single unit.

Fig. 6 is a side elevation showing a series of recording elements and the electro-magnetic operating mechanisms.

Fig. 7 is a top plan view of Fig. 6.

Fig. 8 is a fragmental view showing one form of markings which may be used for the paper tape.

Fig. 9 is a detail illustrating the use of a cyclometer in connection with one of the recording elements.

Figs. 10 and 11 are side elevational views of a single and a series of magnetic operating means respectively, showing a modified form.

Figure 1:
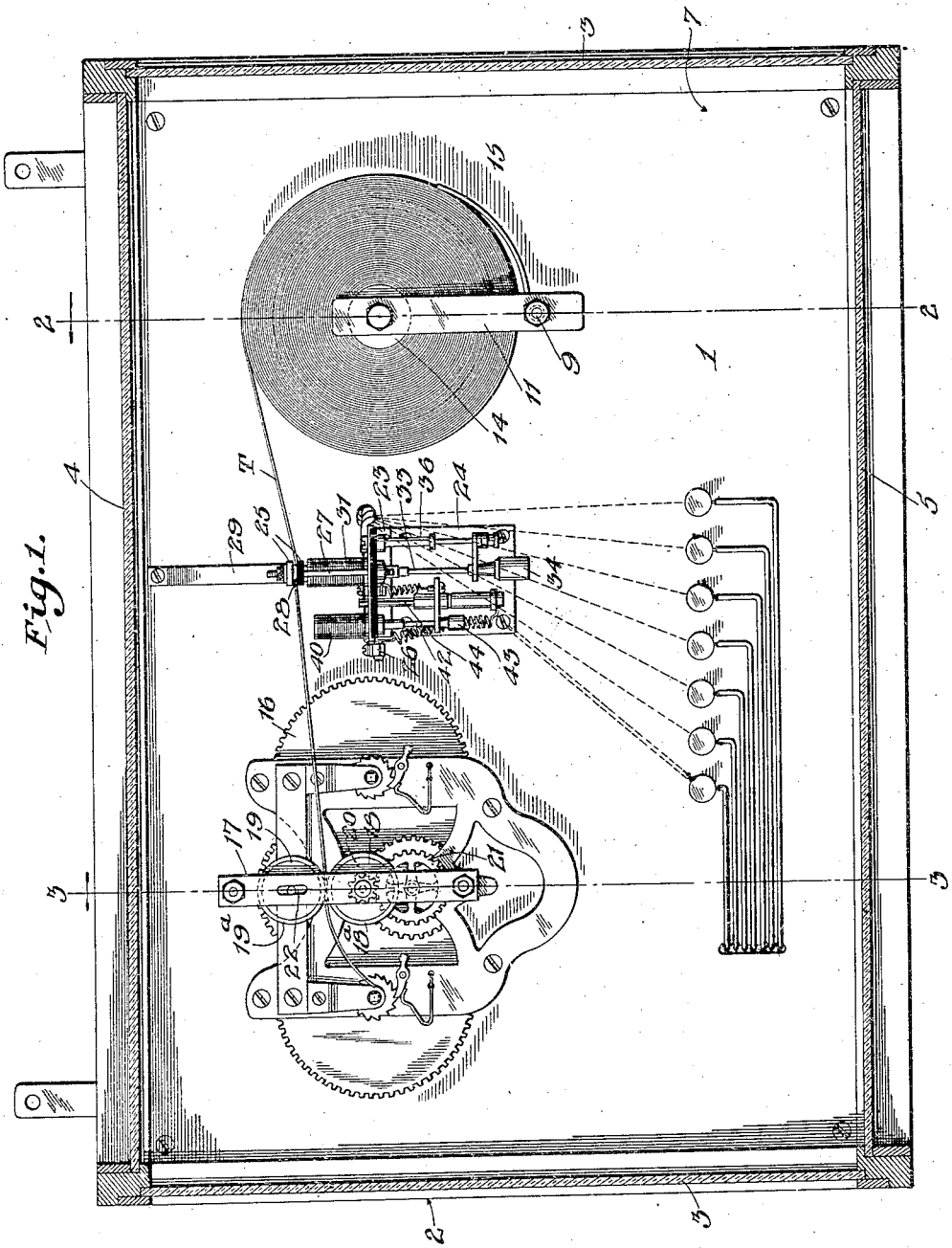
Figure 1 is a front elevation of the recording instrument with the casing shown in section.

Referring now to the drawings the recording mechanism and instrumentalities are preferably fixed to a supporting board 1, which forms the back of a rectangular dust proof casing 2, having sides 3, bottom 5 and top 4 of glass and a hinged glass door 6, provided with any suitable form of locking means 6. This instrument box 2 contains, except for the necessary electric wiring and contact makers, practically all the mechanism needed for a complete installation of the invention, and it may be placed conveniently in the main office of the plant, where its records are to be observed from time to time.

The apparatus within the instrument box 2 consists of three essential mechanisms, viz, a suitable tape roll support; a device for feeding out the paper tape and the recorder through which the paper is guided and by which it is perforated at intervals.

A metal plate 7 is secured to the inner face of the back 1 of the instrument box 2. At one side of the plate 7 a supporting bracket 8 is attached, having extending therefrom at right angles a lower rod 9 and an upper rod 10. The lower rod 9 supports an upright plate 11 having an inwardly projecting screw-threaded rod 12 carried thereon. The inner ends of the rods 10 and 12, respectively are pointed to form anti-frictional bearings for the spindle 13 of a paper tape spool 14. A curved metal spring is pivotally attached to the lower rod 9 and bears frictionally against the outside surface of the paper roll P to prevent undue loosening of the tape as it is fed from its spool 14.

The mechanism for feeding out the tape is located at the opposite side of the plate 7 in substantially horizontal alinement with the spool spindle 13. Any usual form of clock-work 16 will suffice for this purpose. For convenience of illustration, the works of an ordinary eight day clock are diagrammatically shown in Fig. 1. A supporting frame 17 is attached to the clock-work 16 and in it bearings are provided for two rollers 18 and 19 between which the paper tape T is adapted to pass. The lower of these, roller 18 has keyed to its spindle at one end a gear wheel 20 in mesh with a pinion 21 non-rotatably mounted on the shaft of the clock-work that moves the minute hand. The outer surfaces of the rollers 18 and 19 are coated with sleeves $18^a$, $19^a$ of rubber or other suitable material to prevent slipping of the paper tape. The upper roller 19, which is a mere idler and friction member has its spindle ends bearing in vertical slots 22 for reasons obvious from its function.

From the arrangement just described, it is apparent that the rate of speed at which the tape is fed out, can be varied at will by using gears and pinions corresponding to 20 and 21 of different sizes, or by substituting different sized rollers for 18 and 19, or by doing both.

The remaining device within the instrument case 2 consists of the recorder mechanism proper, and it is with the construction and operation of this part of the apparatus particularly, that the present invention treats.

The recorder mechanism may consist of any number of associated electromagnetically operated units, six being here shown by way of example (see Fig. 6). Though the recorders and their actuating devices are associated together and carried on a common support, they are each controlled by a separate electric circuit representing the different stations throughout the plant. A horizontal shelf 23 of wood or other suitable non-conducting material is secured by an integral arm 24 to the plate 7 at the rear of the casing. At one side of the shelf 23 a strip of conducting material 26 is attached and acts as connecting means for the primary return of the several circuits, as will be hereinafter more fully described. This shelf 23 serves as a support for the series of recorder elements and their actuating devices, which are arranged in a row transversely thereof.

Above the recorders are a pair of parallel guide strips 25—25, supported by upright rods 27 carried by the shelf 23. The guides 25—25 are spaced apart by washers 28 to allow the passage of the paper tape therebetween and are further perforated at intervals throughout their length to permit the plungers of the recorders to go through the paper.

In addition to the upright rods 27 the upper structure is steadied and supported by a depending brace 29, secured at its lower end to the forward part of the upper guide 25 and at its upper end to the back plate 7 of the casing. The lower of the guides 28 is preferably formed of insulating material.

Since each recorder with its controlling coils, guides and wiring connections is an exact duplicate of every other in the series, only one will be described in detail by way of illustration.

Referring to Fig. 4, the recorder element consists of a vertically reciprocating element 30 constituting the movable core of an electromagnet coil 31, which magnet is fixed to a bushing 32 set into the shelf 23. The plunger 30 is formed at its upper end with a sharpened pointed extremity $30^a$ adapted to perforate the paper tape. The plunger 30 is further provided with a downwardly extending stem 33, which has adjustably carried thereon a weight member 34. A horizontal bar 35 is also carried by the stem 33 being fixed in relation to the weight 34. The bar 35 has a short extension 35$^a$ at one side, the function of which will be hereinafter described, and it also has a longer extension 35$^b$ at the other side perforated to slide vertically on an adjustable guide rod 36 depending from the underside of the shelf 23. Suitable buffers 37 are provided on the rod 36 against which the guide arm 35$^b$ contacts in its reciprocatory movements. A threaded nut 38 at the lower end of guide rod 36 can be adjusted to position an insulating stop 39 and buffer 37. In each unit a second electro-magnetic coil 40 is mounted at one side of the coil 31 and is provided with a vertically reciprocating plunger or core 41, having a depending extension 42 upon the lower end of which an adjustable weight 43 is screw-threaded. A second depending rod 44 of insulating material is secured to the underside of the shelf 23 between the coils 40 and 31. The lower ends of the rods 44 are connected by a strip 45 and each individual rod 44 has supported just above the strip 45, a tubular sleeve 46 having an inwardly inclined conical opening 46$^a$. A freely slidable sleeve 47 is carried on the rod 44 and is formed with a tapering lower end 47$^a$ adapted to fit in the conical opening 46$^a$ of the lower member.

In addition, the movable sleeve 47 is formed with an integral transverse arm providing at one side a perforated arm 47$^a$, slidably guided on the extension 42 of plunger 41 and at the other side providing an extension 47$^b$ normally projecting into the path of upward movement of the extension 35$^a$ carried on the part 33. The coil 40 is much smaller than the coil 31 and is made of much finer wire, hence is of higher resistance than the latter, the purpose of which will be hereinafter set forth.

Having described in detail the mechanical features of construction of these parts, the electrical wiring and circuits will be traced out for a single unit, reference being made particularly to Figs. 4 and 5.

In order to accomplish actuation of the recorder element at the proper time, each unit is connected by a wiring system with a contacting device located at the particular station from which it is desired to have a record made.

Several stations are usually provided, located at different places throughout the plant. It is to be understood that the various chutes or stations are independent and do not follow one another in a continuous path of travel along a single route, but represent distinct and separate courses along which the cakes of ice are fed during the different stages of manufacture. The one element common to them all is the recorder mechanism centrally located and making a record for the several stations.

The present invention can be conveniently applied to an ice plant and in the diagram shown in Fig. 5, circuit closing contacts $a$, $b$ are diagrammatically shown, similar to those described in my Patent No. 1,153,658, dated Sept. 14, 1915, and used in connection with an ice chute. A single battery B is sufficient to supply the necessary current, and a wire from one side of the battery passes to the coils 40, and 31, which are connected in series. From thence connection is made by means of the wire $e$ to the contact $a$. The main circuit is closed by a wire $f$ connected with the other contact $b$ and returning to the other side of the battery B. A branch wire $g$ is connected to the wire $d$ between the battery B and a coil 40. This wire is connected to the lower end of the sleeve 45, which is of conducting material. A wire $h$ is led from the wire $d$ at a point located between the coils 40, 31 and is electrically connected at its other end to a terminal carried on the cross arm 47$^b$ of the sliding sleeve 47.

In operation, when a cake of ice passing through the station closes the contacts $a$, $b$, current flows through the following path: from battery B through wire $d$, by way of the branch wire $g$, through the sleeve 46 and sliding member 47, wire $h$, through coil 31, energizing the same, by way of wire $e$ to the station and completing the circuit through wire $f$, back to the battery B. As has already been stated, the coil 40 is of greater resistance than the coil 31, hence the current flows through the line of least resistance and energizes, at first, only the larger coil of the two. Upon energization of this coil the plunger core 30 is drawn upwardly so that its pointed end 30$^a$ perforates the paper tape and simultaneously with this movement the cross arm 35$^a$ is raised contacting with the lower side of the extension 47$^b$ of the sliding member 47 and raising this member with it. The result of this action is that the circuit depending upon the contact between the members 47 and 46 is broken the instant the member 47 begins to rise and hence the current will flow through coil 40 directly and also through coil 31.

After cross arm 35$^a$ has contacted with the extension 47$^b$ the member 47 is carried upwardly and retained in its elevated position by the energization of magnet 40, such condition obtaining so long as the inner circuit is closed.

The object of this double arrangement of coils is for a two-fold purpose. In the first place, in order to make the operation of the device automatic, so that where a number of several units are connected in series, the plungers 30 will drop back to their original lowered position, after perforation of the paper, it is necessary that some means be provided for the partial deënergization of the coil 31. This means in the present form is the coil 40. which does not become energized until after the upward movement of the plunger 30 has commenced. In the second place in order to prevent the destruction of the coil 31 in case a contact should be held for an unnecessary length of time, the coil 40 will be thrown in and the increased resistance tends to protect the winding of the coil 31. The arrangement of weights carried on the lower ends of the extensions 33, 42 is such that after the coils have performed their proper functions, they are returned by gravity to their normal positions respectively, and in proper sequence of time.

According to the present invention should two or more of the stations be operated simultaneously the record strip would be perforated in several places at the same instant. By providing for the instantaneous withdrawal of the perforating members 30 any accidental clogging up of a single station would not destroy the record sheet nor would it in any way impair or interfere with the action of the other recording elements.

The plunger 30 can be adjusted vertically so as to regulate the size of the perforation made in the paper tape, depending upon the amount of penetration by the pointed end 30$^a$ in its upward movement.

There are some instances when it is desired to have the recorder element temporarily retained in its withdrawn position in the coil, for example where the device is adapted to be used in connection with an arm signaling apparatus. In such cases, it is not necessary to provide the supplemental coil 40 for the purpose of obtaining an automatic effect. Figs. 10 and 11 illustrate a modified form of the device, in which the coil 40 and its associated parts are entirely omitted.

In order to provide an additional checking means upon the number of times the several recorder elements are operated, a cyclometer C may be provided, as shown in Fig. 9, with its actuating wheel in the path of movement of the extension 35$^b$ to which a small projecting pin $p$ is attached.

It will be understood that the cyclometer must necessarily be of that type which is operated when its wheel is given an impetus in one direction only.

From the foregoing description the operation of the device will be clearly understood.

Fig. 8 illustrates one form of markings which may be made upon the paper tape. This form of chart illustrates a convenient arrangement for the apparatus when it is intended to be used in connection with six different stations.

The longitudinal lines numbers 1 to 6 inclusive represent the several stations and the strips embraced by these lines are adapted to move over the corresponding recorders connected with the respective stations.

The transverse lines indicate intervals of time and may be selected or proportioned according to the rate of speed at which the paper is intended to be fed through the recording mechanism.

In the form shown in Fig. 8 the interval between any two transverse lines represents five minutes and this is selected merely by way of example. A series of transverse perforations are provided at intervals throughout the tape and represent the end of a record strip for one day and the beginning of the record strip for the next day. In this manner the tape can be taken from the apparatus and the records for each day separated and put away in the files.

What I claim is:—

1. A recording instrument including a recording element, an electro-magnet serving to effect the recording movement of said element, and additional mechanical and electromagnetic means for effecting the return of said element to its normal idle position.

2. A recording instrument including a recording element, an electro-magnet serving to effect the recording movement of said element, a weight member carried by said recording element to partially effect the return of said element to normal position and a second electro-magnet for partially deenergizing the first electro-magnet, and supplementing the action of said weight.

3. A recording instrument including a recording element, an electric circuit, an electromagnet included in said circuit for effecting the recording movement of said element, a second electromagnet and means automatically operated by said recording element for throwing said second magnet in the circuit with said first mentioned magnet.

4. A recording instrument including a recording element, a normally open electric circuit, means for closing said circuit, a pair of electromagnets, one of said magnets serving to effect the recording movement of said element when the circuit is closed, and means controlled by said element for throwing the second electromagnet into the circuit in series with the first magnet.

5. A recording instrument including a recording element, a normally open electric circuit, means for closing said circuit, a pair of electromagnets, one of said magnets serving to effect the recording movement of said element upon the closing of said circuit, means carried by said element for automatically throwing the second magnet into circuit in series with the first magnet before the recording movement of the element is effected, whereupon said second magnet permits the return of said element to normal idle position and a weight carried on said element for returning it to normal position.

6. A recording instrument including a recording element, a normally open electric circuit, means for closing said circuit, a pair of electromagnets, one of said magnets serving to effect the recording movement of said element upon the closing of said circuit, adjustable means carried by said element for automatically throwing the second magnet into the circuit in series with the first magnet prior to the completion of recording movement of said element and an adjustable weight carried on said element for effecting its return to normal idle position.

In testimony whereof I affix my signature in presence of two witnesses.

JAMES C. WARREN.

Witnesses:
WM. M. LAND,
J. L. SUITER.

Copies of this patent may be obtained for five cents each, by addressing the "Commissioner of Patents, Washington, D. C."